July 13, 1948.  F. F. TESSIN  2,445,251
MECHANICAL RAKE CLASSIFIER
Filed Jan. 28, 1944
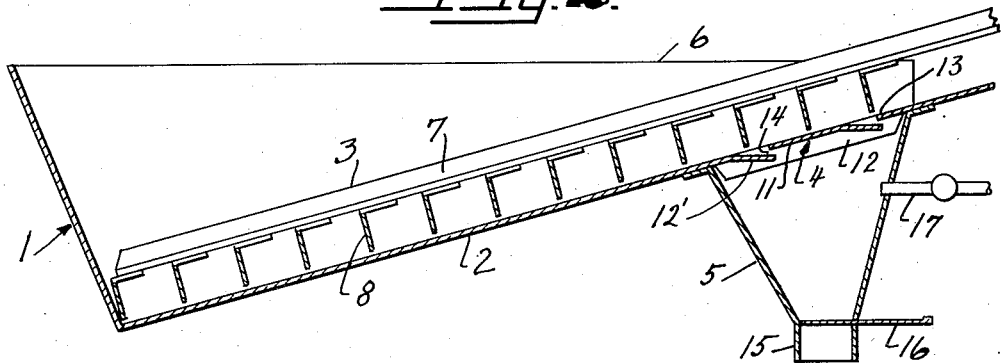
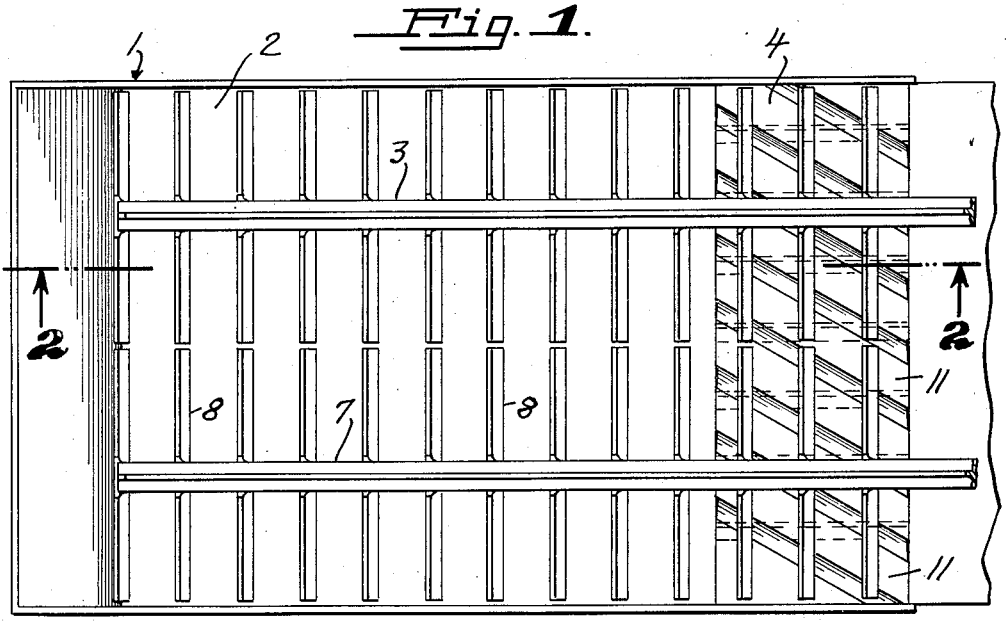
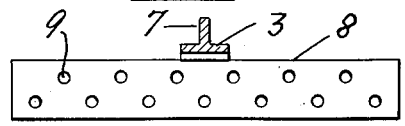
INVENTOR,
FRED F. TESSIN.
BY
A. Schapp
ATTORNEY.

Patented July 13, 1948

2,445,251

UNITED STATES PATENT OFFICE 2,445,251

MECHANICAL RAKE CLASSIFIER

Fred F. Tessin, Santa Rosa, Calif.

Application January 28, 1944, Serial No. 520,018

10 Claims. (Cl. 209—462)

The present invention relates to improvements in mechanical rake classifiers, and its principal object is to provide a machine for treating sands and water in a flowing pulp containing particles of dense and lighter minerals in all sizes up to a certain limit; for stratifying the pulp by raking action into two layers, a lower stratum containing the denser and smaller particles and the upper one containing the less dense and the larger particles; for separating the lower stratum by mechanical or shearing action from the upper stratum, and for discharging the separated stratum into a hutch, the latter having means for controlling the flow of pulp therethrough.

Further objects and advantages of my invention will appear as the specification proceeds and the novel features of my ore classifier will be fully described in the claims hereto attached.

The preferred form of my invention is illustrated in the accompanying drawing forming part of this application, in which:

Figure 1 shows a top plan view of my classifier;

Figure 2, a longitudinal section taken along line 2—2 of Figure 1;

Figure 3, an enlarged section through a grizzly used in my machine, taken at a right angle to the slots in the grizzly; and Figure 4, an enlarged detail view of a rake blade used in my invention.

While I have shown only the preferred form of my invention, I wish to have it understood that various changes or modifications may be made within the scope of the claims attached hereto without departing from the spirit of the invention.

Referring to the drawing in detail, my classifier comprises in its essential features, a settling tank 1 having a sloping bottom 2, a rake 3 movable over the bottom of the tank, a grizzly 4 in the upper part of the bottom, and a hutch or box 5 underneath the grizzly to receive the discharge thereof.

The tank 1 may be from six to twelve feet in length and approximately four feet wide and may be about two feet deep at its lower end, to have a capacity of from 100 to 500 tons per day. These dimensions may be changed, of course, to suit working conditions.

The tank is open at its upper end to allow of overflow over the latter, the side walls being preferably somewhat higher than the ends of the tank, as shown at 6. The bottom of the tank slopes at a suitable angularity to effect movement of the material in a desired manner.

The rake 3 is substantially co-extensive with the width and the length of the tank, and may be made, for convenience in handling, in two or more sections, as indicated in the drawing. Each section comprises a longitudinal supporting bar 7 and a plurality of rake blades 8 attached thereto.

The blades are substantially vertical or perpendicular to the bottom of the tank. For use in connection with a tank of the dimensions indicated, the blades may be about four inches deep. Each blade is formed with a plurality of perforations 9 evenly distributed over the length of the blade.

The perforations 9 should be sufficiently large to allow the largest particles of the material under treatment to freely pass therethrough and may be about ten times the size of the largest particles. In the machine described herein, they are about one inch in diameter.

The rake blades are operated in a manner to produce raking action, that is, to move upward over the bottom of the tank and in close proximity thereto, in a raking stroke, to be then lifted and returned at a higher elevation, and to come down again for the next raking stroke. Mechanisms for effecting the raking motion are well known in the art and therefore need no description in the present application. Reference may be had, for instance, to mechanism described on pages 595–596 and 611–613 of Taggart's Handbook of Ore Dressing, of 1927. Though the type of mechanism employed for causing rake blade movement will not vary the spirit of the invention, I prefer the reciprocating rake mechanism because of its utility, and this is the type shown partially in the drawing.

The principal distinguishing feature of my rake resides in the fashioning of the rake blade.

It is essential in my invention that the raking convey sands through the machine; however, there are no other similarities to ordinary classifiers, either in principle of operation or in character of product.

The purpose of the raking is twofold. Besides serving to convey sands over the tank bottom, it agitates the settled sands to keep them in a loose and free condition, the particles being neither interlocked nor packed, allowing movement of the particles among themselves.

The rake blades are fashioned as mere flat plates, so as to stir solid particles into suspension as little as possible, and they are perforated so as to allow the settled sands to run through somewhat, this running of the sands keeping it loose and free.

The pulp may be introduced near the deep end of the tank. The solid particles in the pulp settle and are conveyed up the tank bottom in a loose and free condition. The smaller and denser particles within the settled mass gravitate downward, sifting and crowding their way through interstices between the larger and lighter particles. Denser particles are able to crowd relatively deeper than lighter particles. The ability of the particles to descend is in inverse relation to their size and direct relation to their density.

Simultaneously, at each stroke of the rake blades, the mass of sands is lifted slightly from the tank bottom, and, on resettling, the smaller and denser particles, descending even further, leave the larger and lighter particles above.

Thus stratification of the settled sands according to the ability of the particles therein to descend is eventually carried to completion.

It is the object of the present invention to separate the lower strata containing smaller, denser particles from the upper strata containing larger, lighter particles while they travel through the machine, and for this purpose I provide the grizzly 4 at the upper end of the tank. The grizzly is intended to shear or slice off the lower stratum and to deliver the particles found therein to the hutch or box 5 underneath the grizzly.

The grizzly comprises a plurality of flat strips of metal 11 mounted upon longitudinal runners 12. The rear section 12' of each strip is bent downward to extend underneath the front edge 13 of the succeeding strip and to form a vertical slot 14 therewith. The slots are preferably arranged at an angle with respect to the length of the tank, as shown in the drawing.

The slots overlap so that all the material passing through the tank, through the full width of the latter, has to pass over or through a slot. It is essential that the slots be vertical, and not horizontal, so that the sands do not fall through by gravity alone, but are crowded through by the rake action.

The slots thus serve to shear or slice off the lower stratum for delivery to the hutch 5, while allowing the upper stratum to proceed for discharge over the upper end of the tank bottom.

The amount of sand raked through the grizzly is controlled by various factors, as by the size and number of the slots, the amount of overlap of the strips forming the slots, and the amount of water drawn off with the sands raked therethrough.

The hutch or box 5 fits tightly against the bottom of the tank so as to form a water-tight unit therewith, and is preferably made to taper down to a relatively narrow outlet 15, controlled by the gate 16. The latter gate controls the amount of water passing from the tank through the grizzly with the sands, which usually should not be more than enough to sweep the sands out. A fresh supply of water may be introduced into the hutch through the pipe 17 to reduce the amount of water drawn through the grizzly.

The grizzly underflow and the overflow (over the upper end of the tank) may be proportioned to suit the character of the sands and the operating conditions. If the heavy mineral in the sands is small in amount, if it be exclusively in particles, or if its density is comparatively high, the underflow can be regulated to contain all the denser mineral, and then only the underflow will have to be treated to separate the mineral. However, if conditions are otherwise, then the larger particles of the denser material will be found in the grizzly overflow, and they may be easily separated from the lighter mineral.

The water used in the machine will contain the particles of mineral too light and too fine to settle. The amount of this water in excess of that drawn off with the grizzly underflow may be removed from the machine by flowing out with the grizzly overflow, or, if desirable, as a separate slime product at some other point, as in ordinary classifier practice.

The products of the differential classification hereinabove described may be treated for the separation of the denser and lighter minerals on any type of device suitable for the purpose, such as gravity concentrators, ordinary classifiers or amalgam plates.

It will generally be of advantage to return tailings from the device treating the grizzly underflow back into the tank, for certain particles lost in the tailings may be saved in the next circuit through the classifier.

This method will also build up a load of dense, fine mineral in the classifier tank, which will aid in excluding the larger lighter particles from the grizzly underflow, and to cause all of the lighter particles to eventually leave the system in the grizzly overflow or in the slime.

I claim:

1. A classifier of the character described, comprising a tank for holding pulp having an inclined bottom and a rake operable for raking action over the bottom, the rake having flat vertical blades perforated to allow pulp to pass therethrough and to keep the pulp in a loose flowing condition, whereby the denser and smaller particles are made to sift and crowd downward to form a lower stratum and the lighter and larger particles are made to form an upper stratum, and the tank bottom having undercut slots in the upper end thereof for shearing off the lower stratum as the pulp advances, with a box underneath the slots for receiving the lower stratum, and means associated with the box for controlling the flow of water therethrough.

2. A classifier of the character described, comprising a tank for holding pulp having an inclined bottom and a rake operable for raking action over the bottom, the rake having flat vertical blades perforated to allow pulp to pass therethrough and to keep the pulp in a loose flowing condition, whereby the denser and smaller particles are made to sift and crowd downward to form a lower stratum and the lighter and larger particles are made to form an upper stratum, and the tank bottom having undercut slots in the upper end thereof for shearing off the lower stratum as the pulp advances with a box underneath the slots for receiving the lower stratum, and an adjustable outlet gate for the box whereby the flow of water from the tank through the box may be controlled, and means for admitting an independent flow of water into the box whereby the water flow from the tank through the box may be further controlled.

3. A classifier of the character described, comprising a tank for holding flowing pulp and having an inclined bottom, means for raking the pulp upward along the bottom including means for stratifying the pulp particles, and means associated with the bottom of the tank and within the flow area for shearing off a lower stratum of the advancing material, and a box underneath the latter means for receiving the lower stratum, the box having means for controlling the flow of the water therethrough.

4. A classifier of the character described comprising a tank for holding liquid flowing pulp having an inclined bottom and a rake operable for raking action over the bottom, the rake having flat perpendicular blades with sufficient face area for advancing the material and with spaced openings large enough to allow all sizes of pulp particles under treatment to freely pass therethrough and to keep the pulp in a loose flowing condition, whereby the denser and smaller particles are made to sift and crowd downward to form a lower stratum and the lighter and larger particles are made to form an upper stratum, and the tank having means near its upper end and below water level for shearing the lower stratum out of the tank, while the pulp is still in the loose flowing condition.

5. A classifier of the character described comprising a tank for holding liquid flowing pulp having an inclined bottom and a rake operable for raking action over the bottom, the rake having flat perpendicular blades with sufficient face area for advancing the material and with spaced openings large enough to allow all sizes of pulp particles under treatment to freely pass therethrough and to keep the pulp in a loose flowing condition, whereby the denser and small particles are made of sift and crowd downward to form a lower stratum and the lighter and larger particles are made to form an upper stratum, and the tank bottom having undercut slots in the upper end thereof and below water level for shearing off the lower stratum as the pulp advances, and while the pulp is still in a loose flowing condition.

6. A classifier of the character described, comprising a tank for holding liquid flowing pulp having an inclined bottom and a rake operable for raking action over the bottom, the rake having flat perpendicular blades with sufficient face area for advancing the material and with spaced opening large enough to allow all sizes of pulp particles under treatment to freely pass therethrough and to keep the pulp in a loose flowing condition, whereby the denser and smaller particles are made to sift and crowd downward to form a lower stratum and the lighter and larger particles are made to form an upper stratum, and the tank bottom having undercut slots in the upper end thereof and below water level for shearing off the lower stratum as the pulp advances and while the pulp is still in a loose and flowing condition, with a box underneath the slots for receiving the lower stratum.

7. In a classifier of the character described, a tank bottom plate having means for raking flowing pulp thereover operable for stratifying the pulp, and a grizzly in the plate having a slot therein, the forward wall of the slot presenting a cutting edge to the advancing material and the rearward wall of the slot leading to a point underneath the cutting edge whereby the cutting edge is made to shear off a layer of the advancing material and to discharge the same underneath the plate.

8. In a classifier of the character described, a tank bottom plate having means for raking flowing pulp thereover operable to stratify the pulp, and a grizzly in the plate having a slot therein, the forward wall of the slot presenting a cutting edge to the advancing material and the rearward wall of the slot leading to a point underneath the cutting edge whereby the cutting edge is made to shear off a layer of the advancing material and to discharge the same underneath the plate, the slot being arranged at an angle to the length of the plate.

9. A classifier of the character described, comprising a tank for holding flowing pulp and having an inclined bottom, means for raking the pulp upward along the bottom including means for stratifying the pulp particles, means associated with the bottom of the tank and within the flow area for shearing off a lower stratum of the advancing material, a box underneath the latter means for receiving the lower stratum, an adjustable outlet gate for the box whereby the flow of water from the tank through the box may be controlled, and means for admitting an independent flow of water into the box whereby the water flow from the tank through the box may be further controlled.

10. A classifier of the character described, comprising a tank for holding liquid flowing pulp having an inclined bottom and a rake operable for raking action over the bottom, the rake having flat perpendicular blades with sufficient face area for advancing the material and with spaced openings large enough to allow all sizes of pulp particles under treatment to freely pass therethrough and to keep the pulp in a loose flowing condition, whereby the denser and smaller particles are made to sift and crowd downward to form a lower stratum and the lighter and larger particles are made to form an upper stratum, and the tank having means near its upper end and below water level for shearing the lower stratum out of the tank while the pulp is still in the loose flowing condition, a box underneath the latter means for receiving the lower stratum, an adjustable outlet gate for the box whereby the flow of water from the tank through the box may be controlled, and means for admitting an independent flow of water into the box whereby the water flow from the tank through the box may be further controlled.

FRED F. TESSIN.

REFERENCES CITED

The following references are of record in the file of this patent:

UNITED STATES PATENTS

| Number | Name | Date |
| --- | --- | --- |
| 492,262 | Beaty | Feb. 21, 1893 |
| 1,145,316 | Kelly | July 6, 1915 |
| 1,173,597 | Marcus | Feb. 29, 1916 |
| 1,468,844 | Trott | Sept. 25, 1923 |
| 1,777,182 | Rothelius | Sept. 30, 1930 |
| 2,293,340 | Hirst | Aug. 18, 1942 |

FOREIGN PATENTS

| Number | Country | Date |
| --- | --- | --- |
| 632,360 | Germany | July 7, 1936 |